Nov. 22, 1955   J. F. MURRAY   2,724,406
RELIEF VALVE
Filed April 19, 1951

Inventor
John F. Murray
by Hill, Sherman, Meroni, Gross & Simpson Attys

United States Patent Office 2,724,406
Patented Nov. 22, 1955

2,724,406

RELIEF VALVE

John F. Murray, Macedonia, Ohio, assignor to Thompson Products, Inc., Cleveland, Ohio, a corporation of Ohio Application April 19, 1951, Serial No. 221,771

1 Claim. (Cl. 137—491)

The present invention relates generally to safety valves and more particularly to a safety relief valve capable of by-passing large volumetric flows at a small pressure rise with a valve of greatly reduced area.

Although not necessarily limited thereto, the advantageous features of the present invention are demonstrated to great advantage in connection with the application of the pressure relief valve structure provided in accordance with the present invention to a fuel pump for a high pressure fuel system. In such an environment, it is frequently necessary that a fuel pump be provided with a safety relief valve which will operate not only to limit the pressure at which the fuel is supplied to an engine operating control but also to limit the quantity of flow supplied to the engine control. Since such a valve cannot be allowed to operate at any pressure below the maximum pressure required by the engine, a relatively large quantity of flow must be by-passed with a small pressure rise.

According to the general principles of the present invention, a large volumetric flow is by-passed with a small pressure rise by means of a relief valve structure occupying a particularly compact space so as to be readily applicable to high-pressure fuel systems such as are adaptable for use in the restricted space limitations of an aircraft or other vehicle wherein space limitations are critical.

It is an object of the present invention, therefor, to provide an improved relief valve of compact size which will by-pass large flows at a small pressure rise.

Another object of the present invention is to provide an improved relief valve made of a reduced number of simplified elements which are economical to produce and which will be completely efficient for their intended purpose.

Another object of the present invention is to provide an improved relief valve structure in which valve chattering is minimized.

Many other advantages, features and additional objects of the present invention will become manifest to those versed in the art upon making reference to the detailed description which follows and the accompanying sheet of drawings in which a preferred embodiment of the principles of the present invention is set forth.

The relief valve of the present invention finds a particularly useful application to high pressure fuel pumps such as is contemporarily employed in the fuel systems of aircraft engines. In such an environment, it is necessary to provide a particularly compact relief valve structure which will by-pass a large volumetric flow of fluid at a small pressure rise.

Figure 1:
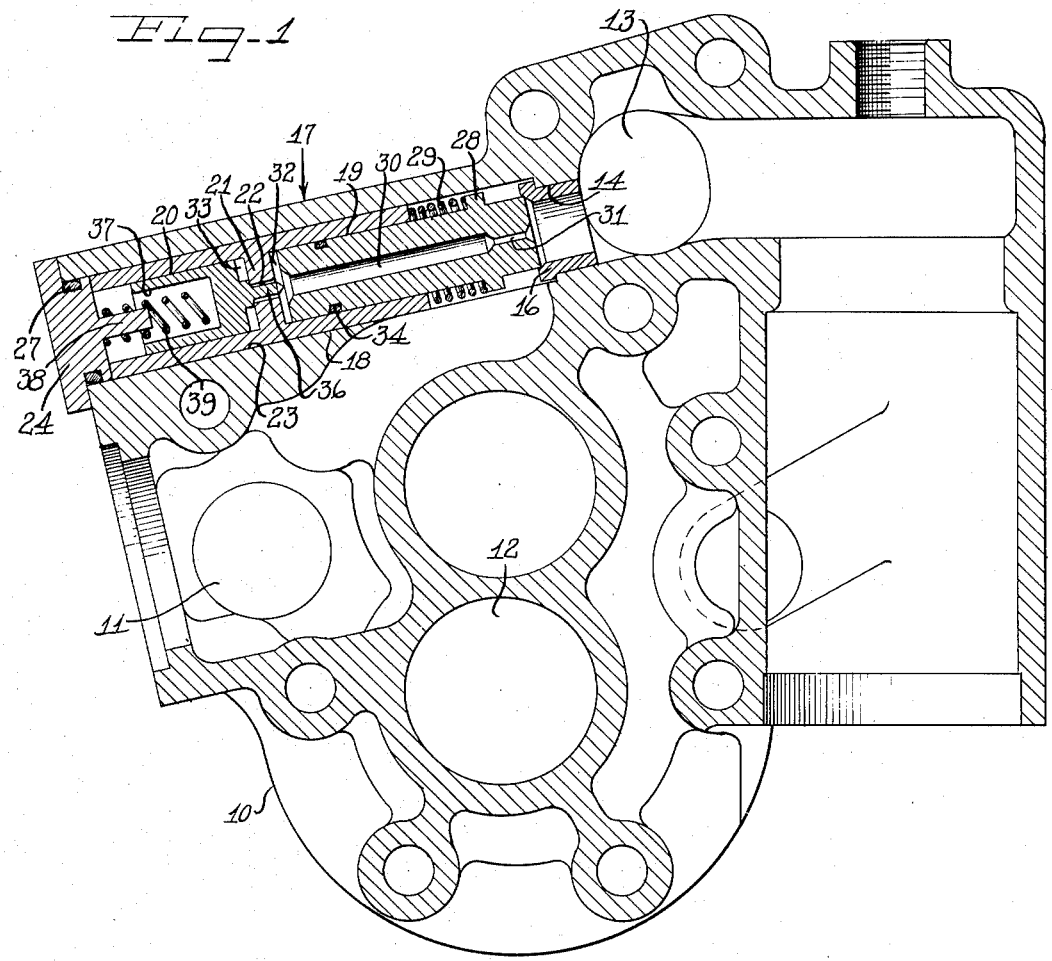
Figure 1 is a cross-sectional view of a high pressure fuel pump incorporating a relief valve provided in accordance with the principles of the present invention.
Figure 2:
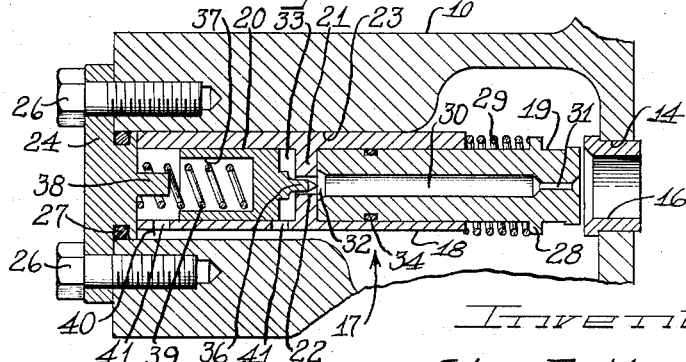
Figure 2 is a fragmentary cross-sectional view showing additional details of construction of the relief valve of the present invention and showing the movable parts of the relief valve assembly moved to an open position to allow by-passing of fluid.

In Figure 1 is shown the casing 10 of a high pressure fuel pump having formed therein an inlet 11 adapted to receive a fluid at a comparatively low pressure and communicating with a pumping chamber 12 wherein the fluid is pressurized and discharged into a discharge outlet 13.

Between the inlet 11 and the outlet 13 is formed an opening 14 adapted to receive a seating insert bushing 16 and constituting a by-pass to be controlled by a relief valve indicated generally by the reference numeral 17.

The relief valve 17 comprises three main elements including a sleeve 18, a relief piston 19 and a metering piston 20. The sleeve 18 consists of a generally tubular element having a medial rib 21 formed in the bore thereof with a restricted opening 22 extending through the rib 21 to establish fluid communication between opposite ends of the bore provided in the sleeve 18. The sleeve 18 is received in a recess 23 formed in the casing 10 and closed by a cap member 24 firmly assembled to the casing 10 by means of a plurality of screws 26. A ring of packing material 27 may be interposed between the cap member 24 and the wall of the recess 23 to insure a sealing of the end of the recess 23.

The relief piston 19 comprises a generally cylindrical element reciprocably received in one end of the sleeve 18 and having a peripheral rib 28 formed thereon so that a coil spring 29 may be bottomed against one end of the sleeve 18 and against the rib 28 to normally urge the relief piston 19 into closing engagement with the seat insert bushing 16.

An opening 30 is formed through the relief piston 19 and is provided with a restricted throat 31 so that discharge pressure at the outlet 13 will be introduced into one end of the bore formed by the sleeve 18. For the sake of convenience, the bore of the sleeve 18 receiving the relief piston 19 may be identified as a first chamber 32 while the bore receiving the metering piston 20 may be referred to as a second chamber 33.

A ring of packing material 34 is located between the walls of the sleeve 18 and the relief piston 19 to seal the first chamber 32 on one side and the metering piston 20 is provided with a needle 36 received by the opening 22 to seal the first chamber 32 on the other side. Thus, discharge pressure introduced into the first chamber 32 will act on the ends of the relief piston 19, thereby to deliver an axial pressure force thereto which together with the bias exerted by the coil spring 29 will normally retain the relief piston in closed position on the seat insert bushing 16.

The metering piston 20 is further provided with a recess 37 while the cap member 24 is provided with a boss 38 so that a coil spring 39 may be bottomed against the cap member 24 and against the metering piston 20 to normally urge the metering piston towards a closed position with the needle 36 in the opening 22.

In an operational environment, it will be understood that the pressure in the first chamber 32 acting against the end of the relief piston 19 plus the load exerted by the coil spring 29 is normally in excess of the total force created on the opposite end of the relief piston 19 by the discharge pressure at the outlet 13.

The fluid pressure in the first chamber 32 is exerted equally in all directions and therefor also acts against a limited area of the metering piston 20 which is exposed to such pressure. Normally, the metering piston 20 is held closed against such pressure force by the coil spring 39 since the coil spring 39 is specifically chosen to exert a predetermined load against the metering piston 20. When the pressure in the first chamber 32 exceeds the bias exerted by the spring 39, however, the metering piston 20 opens. Fluid at discharge pressure is then metered through the opening 22 past the needle 36 and into the second chamber 33.

The sleeve 18 is provided with a flat so that a recess 40 will establish communication between the inlet 11 and the second chamber 33 through a plurality of openings 41 extending through the walls of the sleeve 18. Thus, the second chamber 33 is referenced to the inlet 11 so that the pressure in the first chamber 32 will fall when the metering valve 20 is lifted.

The rate of fall of the pressure in the first chamber 32 is controlled by the position of the needle 36 in the opening 22 and the amount of clearance between the needle 36 and the rib 21. Preferably, the amount of clearance around the needle 36 is maintained small so that the pressure force exerted axially against the metering piston 20 will lift the metering piston far enough off of its seat to prevent sudden closing and to minimize chattering of the metering valve 20 as it is positioned in proximity to the rib 21.

It will be further understood that when the pressure in the first chamber 32 is reduced by passage of fluid through the opening 22, through the second chamber 33 and through the opening 22 and the recess 40 into the inlet 11, the relief piston 19 will rise from its seat on the seat insert bushing 16 thereby permitting by-passing of the fluid at discharge pressure at the outlet 13 through the bushing 16 into the inlet 11.

The spring 29 is preferably chosen to exert a comparatively small load in reference to the hydraulic load exerted on the end of the relief piston 19 by the fluid pressure in the first chamber 32, therefor, the relief piston 19 will rise rapidly off its seat in response to a slight rise in discharge pressure at the outlet 13.

The restriction 31 formed in the opening 30 through the relief piston 19 provides an adequate damping action so as to dampen the pressure changes in the first chamber 32, thereby to stabilize the functional operation of the relief valve assembly 17.

It may be further noted that the sleeve 18 is preferably loosely fitted in the recess 23 of the casing 10 and the coil spring 29 thus develops an additional function since it not only acts to seat the relief piston 19 against the bushing 16 but in addition retains the sleeve 18 against the cap member 24, the spring 29 exerting a smaller load than the spring 39.

It will be apparent to those versed in the art that the structure described above permits the use of a metering piston having a seat of small area thereby facilitating the use of a small, low rate spring to seal against high pressures developed at the outlet 13 so that an especially compact relief valve assembly is provided.

Although various structural modifications might be suggested by those versed in the art, it should be clearly understood that I wish to embody within the scope of this patent all such modifications as reasonably and properly come within the scope of my contribution to the art.

I claim as my invention:

In a relief valve mechanism, a housing consisting of a generally cylindrical sleeve member having an open ended bore particularly characterized by an internal medial rib forming a restricted passageway between a relief piston chamber at one end of said sleeve and a metering piston chamber at the other end of said sleeve, a relief piston in said relief piston chamber having a head portion outside of said chamber adapted to seat in and control a by-pass opening of a pump having a zone at high pressure on one side of said opening and a zone of lower pressure on the other side of said opening, said relief piston having a port formed therein and extending therethrough, one end of said port extending through said head portion to communicate pressurized fluid from the zone at high pressure into said chamber behind said relief piston, a metering piston in said metering piston chamber having a cylindrical body slidably engaging the walls of said sleeve member, said metering piston having an end wall for engaging said medial rib to close said restricted passageway and including an axially extending needle portion complementary in size to and smaller in cross-sectional area than said restricted passageway, said needle portion received in said restricted passageway to control the rate of fall of pressure in said relief piston chamber when said metering piston is moved to open said restricted passageway, separate spring biasing means for said pistons biasing said metering piston towards said rib and biasing said relief piston in outward direction relative to said sleeve member towards closing relation with the by-pass opening, and means confining movement of said pistons within corresponding chambers of said sleeve member, said sleeve member having a plurality of longitudinally spaced openings formed therein spaced apart from one another a longitudinal dimension greater than the length of said metering piston and extending through the walls thereof at said metering chamber for referencing the interior of said metering piston chamber at opposite sides of said metering piston to the zone at lower pressure, said restricted passageway, even when restricted by said needle portion, having a large cross-sectional area than the said port of said relief piston, whereby fluid can be bled from said relief piston.

References Cited in the file of this patent

UNITED STATES PATENTS

| | | |
|---|---|---|
| 582,445 | Tippett | May 11, 1897 |
| 934,083 | Mills | Sept. 14, 1909 |
| 2,333,522 | Clifton | Nov. 2, 1943 |
| 2,351,871 | Parker | June 20, 1944 |
| 2,366,596 | Clifton | Jan. 2, 1945 |
| 2,375,077 | Caserta | May 1, 1945 |
| 2,388,820 | Bonnell | Nov. 13, 1945 |
| 2,451,925 | Curtis | Oct. 19, 1948 |
| 2,580,128 | Renick | Dec. 25, 1951 |
| 2,639,725 | Albright | May 26, 1953 |